United States Patent [19]

Aussenegg et al.

[11] 4,304,582

[45] Dec. 8, 1981

[54] APPARATUS FOR INCREASING THE BREAKING STRENGTH OF GLASS FIBERS

[75] Inventors: Franz Aussenegg, Graz, Austria; Ulrich Deserno, Munich; Dieter Rosenberger, Sauerlach, both of Fed. Rep. of Germany

[73] Assignee: Siemens Aktiengesellschaft, Berlin & Munich, Fed. Rep. of Germany

[21] Appl. No.: 185,482

[22] Filed: Sep. 9, 1980

Related U.S. Application Data

[63] Continuation of Ser. No. 26,039, Apr. 2, 1979, abandoned.

[30] Foreign Application Priority Data

Apr. 21, 1978 [DE] Fed. Rep. of Germany ....... 2817651

[51] Int. Cl.$^3$ ........................................... C03B 37/025
[52] U.S. Cl. ............................................. 65/12; 65/2; 65/13
[58] Field of Search ....................... 65/2, 11 W, 12, 13

[56] References Cited

U.S. PATENT DOCUMENTS 3,697,241 10/1972 Strickland et al. ...................... 65/2
3,881,902 5/1975 De Luca ................................. 65/12
3,881,945 5/1975 Trojer et al. .......................... 65/2 X
4,157,253 6/1979 Herngvist ................................ 65/2

OTHER PUBLICATIONS

Kalish et al., "Probability of Static Failure in Optical Fibers", Applied Physics Letters, vol. 28, #12, 1976, pp. 721-723.
Helfand et al., "Statistics of the Strength of Optical Fibers", J. of Applied Physics, vol. 48, #8, 1977, pp. 3251-3259.
Maurer, "Effect of Dust on Fiber Strength", Applied Physics Letters, vol. 30, #2, 1977, pp. 82-84.
Schonhorn et al., "Epoxy-Acrylate-Coated Fused Silica Fibers with Tensil Strengths . . . Lengths", Applied Physics Letters, vol. 29, #11, 1976, pp. 712-714.

Primary Examiner—Robert L. Lindsay, Jr.
Attorney, Agent, or Firm—Hill, Van Santen, Steadman, Chiara & Simpson

[57] ABSTRACT

The breaking strength of glass fibers, such as generally utilized in optical communication techniques, is materially improved by subjecting a glass fiber to a heat treatment whereby the glass fiber is relatively slowly pulled through a controlled heat zone having a temperature gradient extending from a temperature at or at least relatively close to the softening temperature of the glass fiber to about room temperature.

2 Claims, 1 Drawing Figure

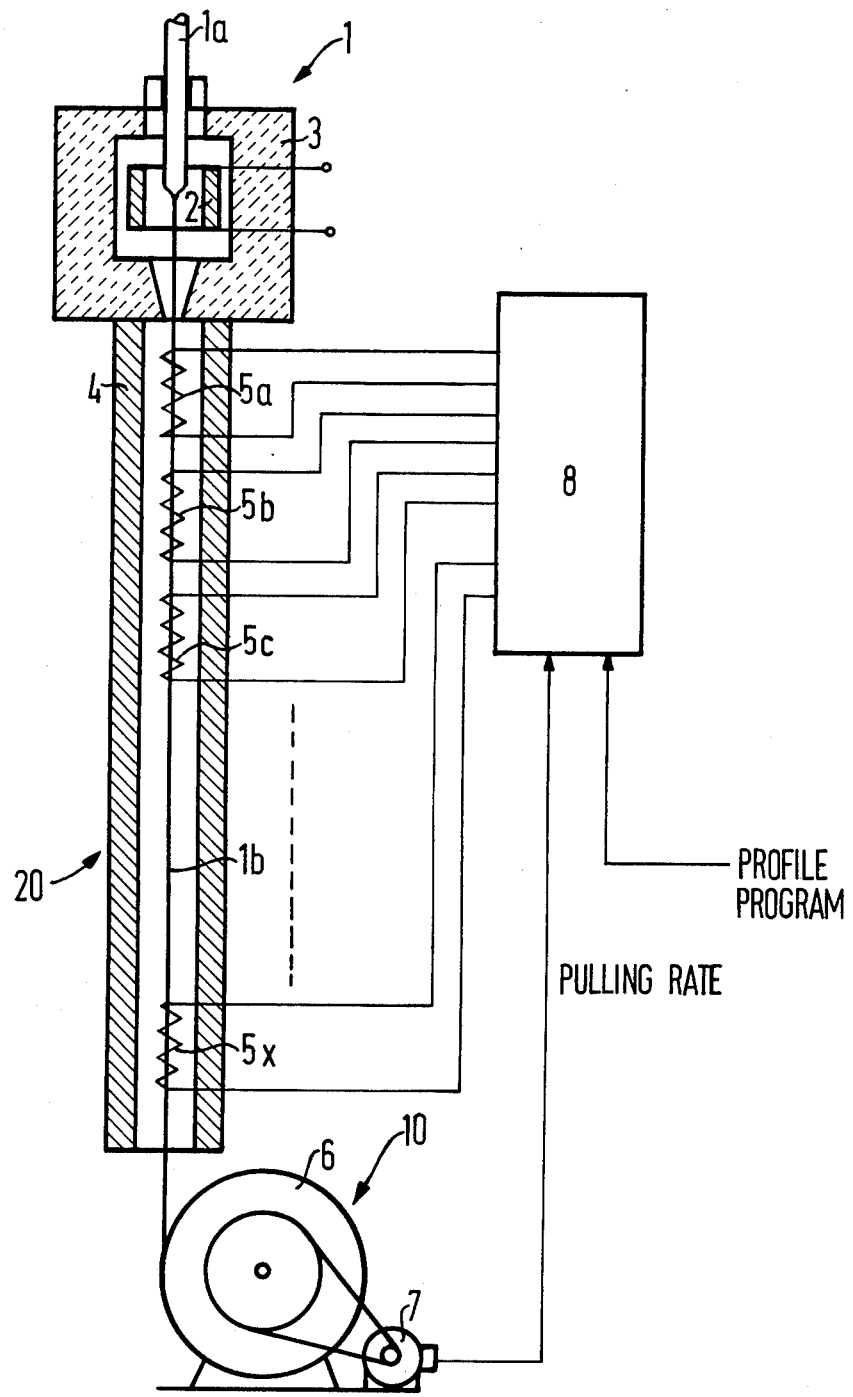

4,304,582

APPARATUS FOR INCREASING THE BREAKING STRENGTH OF GLASS FIBERS

This is a continuation of application Ser. No. 026,039, filed Apr. 2, 1979, now abandoned.

BACKGROUND OF THE INVENTION

1. Field of the Invention

The invention relates to glass fibers and somewhat more particularly to a method of increasing the breaking strength of glass fibers such as generally utilized in optical communication techniques.

2. Prior Art

An essential property characteristic of glass fibers, particularly optical glass fibers, is the breaking strength thereof. The largest possible minimum breaking strength of glass fibers is required, not only for further processing of raw fibers into finished optical cables and the like, but also in the actual utility of light-conductive fibers and/or cables. Even during continuous operational behavior, the breaking strength of glass fibers should not fall below a minimum level.

The breaking behavior of glass fibers is characterized by a lack of a flow range and a specific dependency of breakage statistics on a sample length thereof, both of which indicate the effect of localized flaws on the surface and in the volume or cross-section of a glass fiber [see D. Kalish et al., "Probability of Static Fatigue Failure in Optical Fibers," *Applied Physics Letters*, Vol. 28, (1976) pp. 721–723 and/or E. Helfand et al., "Statistics of the Strength of Optical Fibers," *J. Applied Physics*, Vol. 48, (1977) pp. 3251–3259]. Such local flaws may be geometric irregularities, such as micro-fissures, dust inclusions, bubbles, etc., [see R. D. Mauer, "Effect of Dust on Fiber Strength," *Applied Physics Letters*, Vol. 30, (1977), pp. 82–84] or may be physical-chemical alterations in the glass structure, such as structural flaws, bonding defects, such as $Si^+O^-$-defects in place of non-polar SiO-bonds. It is also known that fissure propagation generally starts as such localized flaws in glass, particularly in the presence of atmospheric water vapor [see *Applied Physics Letters*, Vol. 28 (1976) pages 721–723]. Of course, this has an unfavorable effect on the long-term behaviorly strength characteristics of any affected glass fibers.

Various functional or application measures for maximizing the specific strength behavior of glass fibers are known. For example, production and manipulation of raw glass fibers under dust-free conditions is described in *Applied Physics Letters* Vol. 30 (1977) pages 82–84. A process of coating individual glass fibers with a dense or loose synthetic material is described by H. Schonhorn et al., "Epoxy Acrylate Coated Fused Silica Fibers ... ", *Applied Physics Letters*, Vol. 29, (1976) pages 712–714. Similarly, application of specific priming materials for chemical inactivation of silica surfaces, means for avoiding any type of mechanical stress on optical fibers or on optical cables, such as providing shock-absorbing layers, braiding or otherwise combining individual optical fibers with stronger-material fibers and/or providing separate pulling elements for fibers or optical cables are known. However, these various prior art techniques for maximizing the strength of glass fibers and/or cables during the production thereof are relatively expensive and materially add to the cost of the ultmate product.

SUMMARY OF THE INVENTION

The invention provides a particularly simple, effective and economical method of increasing the breaking strength of glass fibers, particularly optical glass fibers.

In accordance of the principles of the invention, a glass fiber is subjected to a heat treatment by relatively slowly pulling such fiber through a controlled heat zone having a temperature gradient therein extending from a temperature at or at least relatively close to the softening or fusion temperature of the glass fiber to about room temperature. As utilized herein and in the claims, the phrase "at least relatively close to the softening temperature of the glass fiber" will be understood to mean that the upper temperature limit within the controlled heat zone is selected so as to be at least equal to the softening temperature of the glass or at least one of the glasses from which a given fiber is formed, minus 35% of such temperature and not more than equal to such softening temperature plus 10% of such temperature. Further, as utilized herein and in the claims, the phrase "relatively slowly" will be understood to mean that the pulling or travel of a fiber through the heat zone occurs over a time span of at least two seconds.

In accordance with certain preferred embodiments of the invention, the heat treatment occurs during the glass-fiber pulling process, preferably at a point of such process where the temperature of a freshly pulled fiber is still relatively close to the softening temperature of such fiber. In preferred embodiments of the invention, the controlled heat zone is defined by an elongated oven or furnace means having lengthwise spaced-apart predetermined temperature gradients. In certain embodiments of the invention, such elongated oven or furnace means includes a number of electrically energized heating elements arranged lengthwise within such furnace means, each of which may be individually energized and controlled. Preferably, such heating elements comprise ring-shaped elements, with the fiber passing through the annulus of each such element.

BRIEF DESCRIPTION OF THE DRAWING

The FIGURE is, essentially, an elevated cross-sectional somewhat schematic view of an embodiment of an apparatus useful in the practice of the principles of the invention.

DESCRIPTION OF THE PREFERRED EMBODIMENT

The invention provides a particularly simple, efficient and economical method of increasing the breaking strength of glass fibers, particularly optical glass fibers.

In accordance with the principles of the invention, a glass fiber is subjected to a heat treatment whereby such fiber is relatively slowly cooled from a temperature at or at least close to the softening or fusion temperature of the glass fiber to about room temperature.

Glass fibers treated in accordance with the principles of the invention, exhibit a material decrease in the concentration of $Si^+O^-$-defects (this decrease can be readily determined with the aid of its characteristic Raman scattering at 600 cm$^{-1}$), and, accordingly, exhibit an increased breaking strength in comparison to substantially identical fibers not treated in this matter. Prior art manipulations of raw fibers for strength increase is no longer necessary and the process of the invention can be conducted in a very rapid and simple manner so that the cost of the finished fibers is materially reduced. Further, heat-treated glass fibers processed in accordance with the principles of the invention exhibit an improved optical behavior, essentially exhibiting a decrease in scatter losses.

In a preferred method embodiment of the invention, the heat treatment is carried out during the fiber pulling process. In this manner, the pulling process and heat treatment can be carried out as one continuous operation. In this embodiment, it is preferable to start the heat treatment of a fiber at a point of the pulling process where the temperature of the freshly pulled fiber is still relatively close to the softening temperature (as defined hereinbefore) of such fiber.

In a preferred apparatus embodiment of the invention, the heat treatment of glass fiber occurs in an elongated furnace means having a plurality of spaced-apart independently controllable heating members, which are, preferable, ring-shaped and arranged so that the fiber passes through the annulus of such heating members whereby the pulled-through fiber experiences a substantially uniform temperature about its circumferential periphery.

In another method embodiment of the invention, a funished glass fiber is, after the conventional finishing operations are completed, re-heated to a temperature at or at least close to the softening temperature of such fiber and then relatively slowly and controllably cooled to room temperature.

Referring now to the drawing, a fiber-pulling means is illustrated as comprising a heating component 1 and a fiber pulling-storage component 10. The heating component 1 comprises a ring-shaped heating element 2, which typically consists of an electrical resistance heating coil (not shown) which is surrounded by a heat-insulating body 3. The pulling-storage component 10 comprises a drum member 6 and a drive means 7 operationally coupled to the drum for controllable rotation of the drum.

A glass fiber preform 1a may be inserted into the heating element 2 at the beginning of a fiber pulling process. The preform 1a is, preferable, in the form of glass rod comprised of a single piece or an optical core or one or more layer sheathed core. Alternatively, the heating element may include a crucible system having one or two or more crucibles arranged one in the other, in which or at the base of which, pulling nozzles or orifices are provided and pulverized glass or a preform is controllably fed into such crucible system. The glass preform rod 1a or the glass or glasses in one or more crucibles are heated-up to the softening point or melt range of such glass via the heating element and a glass fiber is pulled from such softened stock glass. The pulled-off fiber is attached to the pulling-storage drum 6 so that when such drum rotates an additional fiber length is pulled from the stock material and wound and stored about such drum.

In the exemplary embodiment illustrated, a fiber 1b is continuously pulled from a fiber prefrom 1a. In such process, the fiber preform is continuously re-positioned due to loss of material to the pulling process as when the end of the preform located in the heating element travels beyond such heating element.

Pulled-off fibers cool very rapidly from the softening temperature of the glass or glasses to room temperature. For example, with a typical pulling rate of 20 cm/sec., a pulled fiber attains room temperature after about 1 second, i.e., the pulled-off fiber is already cooled to room temperature when it is only approximately 10 cm below the heating element.

In accordance with the principles of the invention, the fiber to be heat-treated may be a bare core fiber, a core-sheathed fiber or a gradient fiber. Such fiber is relatively slowly cooled from a temperature at least close to the softening temperature (as defined hereinabove) of the fiber to about room temperature in order to increase the breaking strength of such fiber. Such relatively slow cooling occurs over a time period of at least 2 seconds or longer and, generally, the longer the cooling phase lasts, the more benefits are imparted to the so-treated fiber.

The heat treatment of the invention is preferably practiced with an electrically operable furnace means through which the pulled-off fiber is drawn. It is preferable to locate such furnace means between the heating component 1 and pulling-transfer component 10. In this manner, the heat treatment is conducted substantially simultaneously with the pulling-storage process.

This is preferably to locate the entrance of such furnace means as close as possible to the heating component 1. Somewhat more precisely, it is preferable to locate the entrance of a furnace means at a location of the heating component where the freshly pulled fiber is still at or close to the softening temperature of the glass. In this manner, renewed heating of the freshly pulled fiber is not necessary and the relatively slow heat treatment of the invention can be immediately begun.

A pulled-off fiber is caused to travel through a controlled furnace means. Preferably, such furnace means is elongated and is provided with an axially extended, predetermined temperature gradient which decreases as uniformally as possible from a temperature at the entrance thereof which is equal to or at least to close to the softening temperature of the glass to the exit thereof to a temperature about equal to room temperature or thereabouts. The furnace means is preferable provided with a plurality of heating elements spaced apart along the axially length of the furnace means, each of which is independently heated and controlled by an electrically operable control means. Such heating elements are preferably ring-shaped and arranged so that the pulled-through fiber passes through the annulus of each heating member and thereby experiences a uniform heat treatment.

The drawing illustrates an exemplary embodiment of a furnace means 20. The furnace means 20 comprises an elongated tubular body 4 composed of a heat-insulating material and positioned so as to abutt at one end thereof against the bottom of the heat-insulating body 3 of the heating component 1. A plurality of spaced apart heating elements 5a, 5b, 5c through 5x are each arranged within the tubular body 4 along the center axis thereof so that each such heating element surrounds a cross-section of the pulled-off glass fiber 1b, as shown. Preferably, each of the heating elements comprises an electrical heating coil. The heating element 5a is positioned as close as possible to the bottom of the heating coil 2 so that the freshly pulled fiber entering the heating element 5a is still at a sufficiently high temperature (for example, close to the softening temperature of such fiber, but at any rate at least at the temperature which is in the range extending from a temperature about equal to the softening temperature minus 35% thereof to about the softening temperature plus 10% thereof), to beneficially initiate the heat-treatment process.

The heating elements 5a through 5x are each operationally coupled with a master control means 8. In this manner a precise temperature control is facilitated. The temperature gradient provided within the furnace means 20 can be very precisely controlled with the aid of a predetermined program provided to the control means (which is known per se) so that is transmits appropriate signals to the heating elements for a desired temperature at the location of a particular heating element. The program is provided in accordance with the fiber pulling rate. In this regard, the rotational speed of the drive means 7 may be advantageously utilized as the master signal and a signal transmission means (i.e., an electrical line) is provided between drive means 7 and the control means 8.

Normally, a temperature gradient is provided with successively decreasing temperatures from a relatively high temperature at heating element 5a to a relatively low temperature at heating element 5x. The overall length of the cooling furnace and the number of heating elements within such furnace may differ from glass to glass. However, workers of ordinary skill can readily determine a preferred furnace length and a preferred number of heating elements for any particular glass via routine testing. Generally, the longer the furnace means and the greater the number of heating elements therein, the more advantageous effects are noted in the treated fibers.

In an exemplary embodiment, a glass fiber was pulled from a given stock glass through an arrangement substantially as illustrated and was subsequently subjected to a heat treatment by passing the fibre at a speed of 20 cm/s through a furnace means, such as illustrated, consisting of one 10 cm long heating element, heated to 1600° C. and a second 10 cm long heating element, heated to 1400° C. Another glass fiber was pulled from the identical glass stock and through the same set-up, however, the furnace means was removed. A sample of both fibers was then subjected to testing and a decreased in the $Si+O^-$-defects was noted by Raman scattering in the fiber sample treated in the accordance of principles of the invention but not in the other fiber sample.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set-forth and defined in the hereto-appended claims.

We claim as our invention:

1. In a device for producing improved glass fibers useful in optical communication techniques, the combination consisting of:
    a glass melt source for providing freshly drawn glass fibers;
    an elongated tubular body of heat insulating material having a plurality of axially spaced apart independently controllable electric heating elements for individually heating spaced apart zones within said tubular body, said tubular body being relatively closely positioned adjacent said glass melt source so as to receive freshly drawn fibers therefrom at a temperature which is in the range extending from a temperature about equal to the softening temperature of the glass forming such fibers, minus about 30% thereof;
    a control means operationally connected to each of said heating elements to selectively energize each of said heating elements in accordance with a predetermined program; and
    a fiber pulling-storage means positioned below said tubular body for pulling fibers from said melt source and through said tubular body in accordance with said predetermined program.

2. In a device as defined in claim 1, wherein said heating elements comprise ring-shaped members having a hollow annulus for the passage of a glass fiber therethrough.

* * * * *